United States Patent [19]

Fujita et al.

[11] 4,396,953
[45] Aug. 2, 1983

[54] COLOR VIDEO SIGNAL DUBBING SYSTEM FOR COLLATING THE OUTPUTS OF SIGNAL SOURCES

[75] Inventors: Mitsuo Fujita; Kazuo Negishi; Shigenori Onaka, all of Yokohama, Japan

[73] Assignee: Victor Company of Japan, Ltd., Yokohama, Japan

[21] Appl. No.: 210,155

[22] Filed: Nov. 25, 1980

[30] Foreign Application Priority Data

Dec. 6, 1979 [JP] Japan .................. 54-158517
Dec. 6, 1979 [JP] Japan .................. 54-158518
Dec. 6, 1979 [JP] Japan .................. 54-158519
Dec. 6, 1979 [JP] Japan .................. 54-158520
Dec. 6, 1979 [JP] Japan .................. 158521

[51] Int. Cl.³ .................. H04N 9/491; H04N 5/78
[52] U.S. Cl. .................. 358/328; 358/316; 360/33.1
[58] Field of Search .................. 358/4, 8, 37, 39, 40, 358/315–318, 327, 328; 360/30, 33, 33.1

[56] References Cited

U.S. PATENT DOCUMENTS

| | | | |
|---|---|---|---|
| 3,757,034 | 9/1973 | Fujita | 358/4 |
| 3,947,871 | 3/1976 | Amari et al. | 358/8 |
| 3,949,414 | 4/1976 | Hayashi | 358/8 |
| 4,193,084 | 3/1980 | Yamagiwa et al. | 358/4 |
| 4,290,082 | 9/1981 | Hirai | 358/8 |

FOREIGN PATENT DOCUMENTS 2644465 4/1977 Fed. Rep. of Germany.
1545180 5/1979 United Kingdom.

*Primary Examiner*—Aristotelis M. Psitos

*Attorney, Agent, or Firm*—Louis Bernat

[57] ABSTRACT

A color video signal dubbing system comprises a reproducing apparatus and a recording apparatus. The recorded signal is a multiplexed signal of a frequency-modulated luminance signal obtained as the result that a luminance signal separated from the color video signal frequency-modulates a carrier wave to occupy a predetermined frequency band and a frequency-converted carrier chrominance signal obtained by frequency-converting a carrier chrominance signal having a color burst signal which is separated from the color video signal to a band lower than that of the predetermined frequency band. The reproducing apparatus comprises a separation circuit for separating the signal reproduced by the reproducing apparatus into the frequency-modulated luminance signal and the frequency-converted carrier chrominance signal, a level adjusting circuit for adjusting the level of the frequency-converted carrier chrominance signal separated by the separation circuit so that the color burst signal is held to a constant level, a frequency characteristic compensation circuit for compensating for the degradation in the frequency characteristic of the frequency-modulated luminance signal, introduced upon recording and reproducing processes of the frequency-modulated luminance signal separated by the separation circuit, amplitude limiting circuit for limiting the amplitude of the output frequency-modulated luminance signal of the frequency characteristic compensation circuit, and a mixing circuit for mixing the output frequency-modulated luminance signal of the frequency characteristic compensation circuit with the output frequency-converted carrier chrominance signal of the level adjusting means.

14 Claims, 12 Drawing Figures

COLOR VIDEO SIGNAL DUBBING SYSTEM FOR COLLATING THE OUTPUTS OF SIGNAL SOURCES

BACKGROUND OF THE INVENTION

The present invention relates generally to color video signal dubbing systems, and more particularly to a dubbing system which reproduces the color video signal recorded on one magnetic medium and records the color video signals thus reproduced to another magnetic medium, without introducing degradation in the frequency characteristic linearity, pulse characteristic and the like, and furthermore accompanying no beat disturbances or reversal effect and the like.

Conventionally, a so-called low-band frequency conversion system is used as a system which records a color video signal onto a magnetic tape within a relatively narrow frequency band. In this system, the input color video signal is separated into a luminance signal and a carrier chrominance signal. The luminance signal is then frequency modulated, and the carrier chrominance signal undergoes frequency conversion to a frequency band lower than that of the frequency modulated luminance signal. Accordingly, these frequency modulated luminance signal and carrier chrominance signal converted to low-band are multiplexed and recorded on the magnetic tape.

When the color video signal recorded on one magnetic tape by the above procedure are to be dubbed onto another magnetic tape, the frequency modulated luminance signal and low-band frequency converted carrier chrominance signal, which are multiplexed and recorded on the magnetic tape, must first be reproduced by a magnetic reproducing apparatus. The frequency modulated luminance signal is separated from the multiplexed signal and frequency demodulated, while the low-band frequency converted carrier chrominance signal is frequency converted back into the original band. Hence, the reproduced color video signal is obtained by mixing the frequency demodulated luminance signal with the carrier chrominance signal which is frequency converted back into the original band. The reproduced color video signal thus obtained, is supplied to a magnetic recording apparatus, and by the identical signal processing procedure in the recording system as described above, the luminance signal is frequency modulated, the carrier chrominance signal undergoes frequency conversion into a band lower than that of the frequency modulated luminance signal, and the multiplexed signal of the above two signals is recorded onto the other magnetic tape.

Accordingly, the color video signal is recorded onto one magnetic tape through the recording system of the magnetic recording apparatus. Upon dubbing, the signal is reproduced from the magnetic tape by the magnetic reproducing apparatus and undergoes signal processing by passing through the reproducing system of the magnetic reproducing apparatus, and is supplied to the magnetic recording apparatus and recorded onto another magnetic tape after undergoing the identical signal processing procedure as that performed by the above recording system upon the above recording on one magnetic tape.

Hence, according to the above conventional dubbing system, the signal which is to be reproduced from one magnetic tape and dubbed on another magnetic tape must pass through a frequency demodulator, a frequency modulator, frequency converters and the like. Therefore, degradation is introduced in the frequency characteristic, pulse characteristic, linearity and the like, and furthermore resulting in the introduction of degradation in the picture quality due to the effect by the beat interference, and in extreme cases, disadvantageous in that reversal effect in the picture screen is introduced.

SUMMARY OF THE INVENTION

Accordingly, a general object of the present invention is to provide a novel and useful color video signal dubbing system in which the above described problems have been overcome.

Another and more specific object of the present invention is to provide a color video signal dubbing system in which the number of times the color video signal passes through the filter, frequency modulator, frequency demodulator and the like is reduced, during the process in which the recorded color video signal is reproduced from one magnetic medium and dubbed on another magnetic medium.

Other objects and further features of the present invention will be apparent from the following detailed description when read in conjunction with the accompanying drawings.

DETAILED DESCRIPTION

Figure 1:
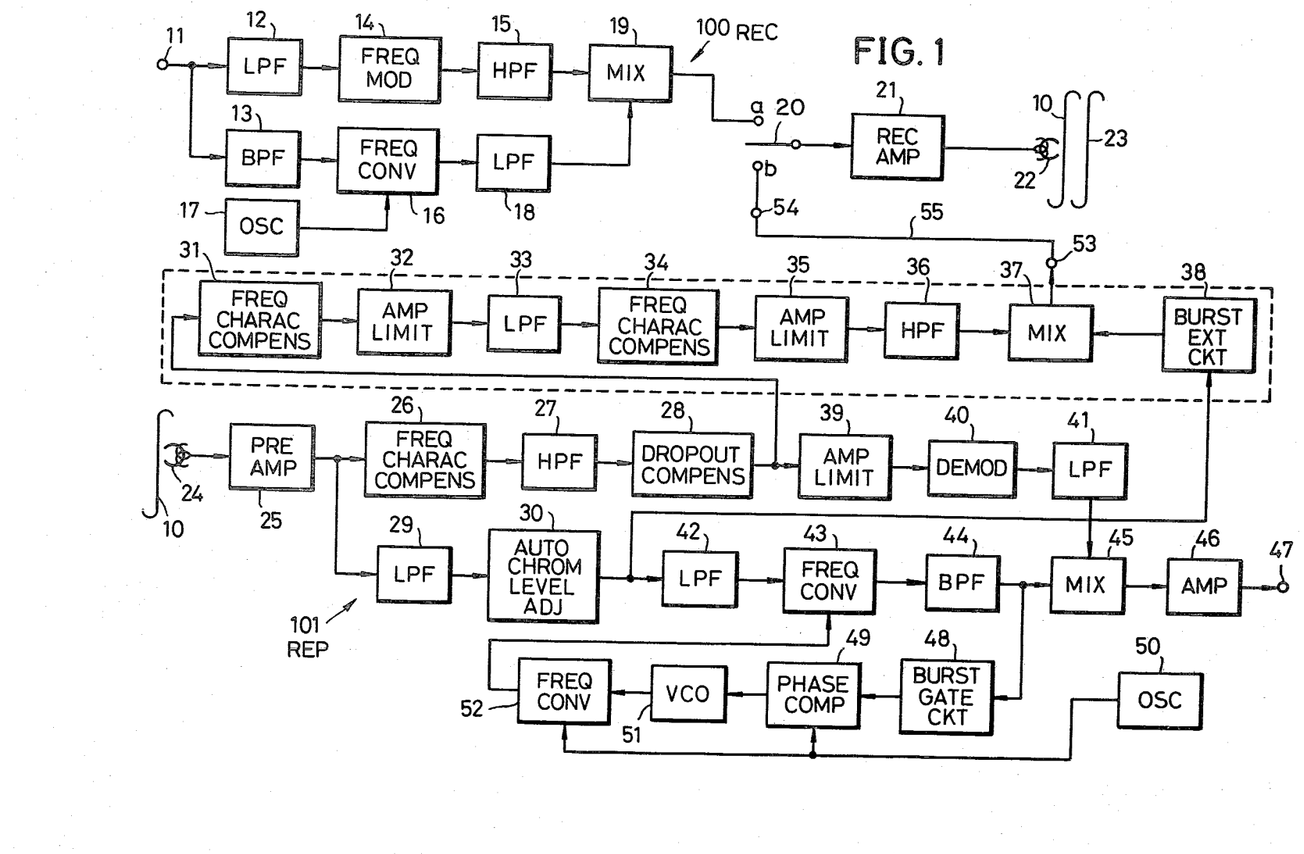
FIG. 1 is a systematic block diagram of an embodiment of a color video signal dubbing system of the present invention.
Figure 2A:
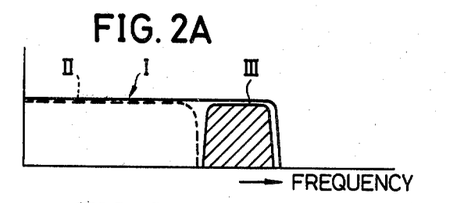
FIGS. 2A through 2F are, respectively, frequency spectrum diagrams of the signals at respective parts of the systematic block diagram of FIG. 1.
Figure 2B:
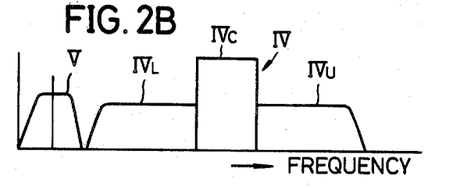

First, a case in which an input color video signal is recorded onto a magnetic tape 10, will be described in conjunction with FIG. 1. During a normal recording mode, a contact part of a change-over switch 20 in a recording apparatus 100 is connected to a contact point a. A color video signal having a spectrum shown by the solid line I in FIG. 2A, is supplied to a low-pass filter 12 through an input terminal 11, and a luminance signal shown by the dotted lines in FIG. 2A is separated and filtered out thereat. On the other hand, the color video signal is also supplied to a band-pass filter 13 through the input terminal 11, and a carrier chrominance signal shown by the solid line III in FIG. 2A is separated and filtered out thereat. The luminance signal from the low-pass filter 12 frequency-modulates a relatively low carrier wave at a frequency modulator 14. A frequency-modulated luminance signal as shown by the line IV in FIG. 2B derived from the frequency modulator 14 is eliminated of its unwanted low-frequency components by a high-pass filter 15, and supplied to a mixer 19. In FIG. 2B, the line IVc shows the frequency deviation band (3.8 MHz to 5.4 MHz, for example), the line IVL shows the upper side band, and the line IVL shows the lower side band.

The carrier chrominance signal obtained from the band-pass filter 13 is supplied to a frequency converter 16, whereupon the carrier chrominance signal undergoes frequency conversion with a signal from an oscillator 17. Accordingly, this frequency converted signal is a low-band frequency converted carrier chrominance signal shown by the solid line V of FIG. 2B, occupying a frequency band lower than that of the above frequency-modulated luminance signal. This low band frequency converted carrier chrominance signal V is supplied to the mixer 19 through a low-pass filter 18, which is used for eliminating the unwanted high-frequency components which introduces disturbances in the above frequency-modulated luminance signal.

The frequency-modulated luminance signal and the low-band frequency converted carrier chrominance signal are respectively mixed and multiplexed, having a suitable level relationship, at the mixer 19, and hence a multiplexed signal as shown in FIG. 2B can be obtained.

The multiplexed signal from the mixer 19 is supplied to a rotating head 22 through the change-over switch 20 and a recording amplifier 21, and is recorded onto the magnetic tape 10 by this rotating head 22.

The mixing ratio between the low-band frequency converted carrier chrominance signal and the frequency-modulated luminance signal at the mixer 19 is, approximately 1/9 to 1/7.

Next, an operation in a case where the signal recorded onto the magnetic tape 10 by the above described procedure is reproduced by a reproducing apparatus 101 and dubbed onto another magnetic tape 23 by the recording apparatus 100, will be described. In this case, the change-over switch 20 of the recording apparatus 100 is connected to a contact b side.

Figure 2C:
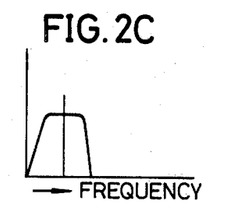

The multiplexed signal having the frequency spectrum shown in FIG. 2B is reproduced from the magnetic tape 10 by a magnetic head 24 of the reproducing apparatus 101. The reproduced signal is amplified by a preamplifier 25 and supplied to a frequency characteristic compensator 26 on one hand, and supplied to a low-pass filter 29 wherein the low-band frequency converted carrier chrominance signal shown in FIG. 2C is separated.

The frequency characteristic compensator 26 is used to compensate the luminance signal demodulation characteristic into a most suitable characteristic, and supplies its output signal to a high-pass filter 27. This high-pass filter 27 separates and filters out the frequency-modulated luminance signal from the reproduced signal. The above separated frequency-modulated luminance signal is then supplied to a drop-out compensator 28 whereupon the frequency-modulated luminance signal is replaced by a frequency-modulated luminance signal of one horizontal scan period before, for example, when drop-out exist, and left as it is when drop-out does not exist, and respectively supplied to a frequency characteristic compensator 31 and an amplitude limiter 39.

Figure 2D:
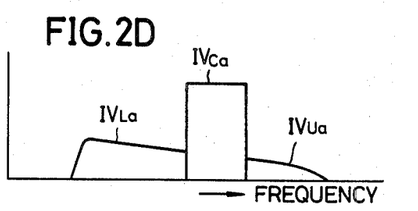

Compensation in the high-frequency components of the frequency-modulated luminance signal which was dropped-out upon reproduction, is performed by the compensator 31. The frequency spectrum of the frequency-modulated luminance signal obtained from the output terminal of the above frequency characteristic compensator 31, is of the form shown in FIG. 2D. As seen in FIG. 2D, the lower side band IVLa of the frequency-modulated luminance signal by the magnetic recording and reproduction is emphasized, and the upper side band IVUa is suppressed, but compensation is seen in the band between the relatively high-frequency parts of the carrier wave deviation frequency band IVCa and the upper side band IVUa (approximately 4.8 MHz to 6.8 MHz).

Figure 2E:
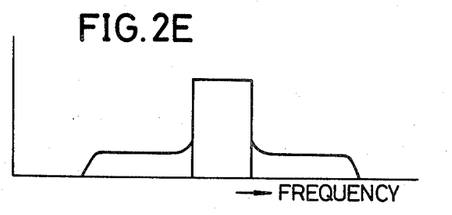

The output frequency-modulated luminance signal of the frequency characteristic compensator 31 is supplied to an amplitude limiter 32, wherein the signal amplitude is limited. Therefore, a frequency-modulated luminance signal having a frequency spectrum shown in FIG. 2E is obtained, in which the upper and lower side bands are averaged on both sides of the carrier wave deivation frequency band (including the side bands of the carrier wave deviation frequency band). The output signal of this amplitude limiter 32 is of a rectangular waveform, and difficult to handle because it contains high-frequency components (odd-number-order harmonics), thus the output signal is supplied to a low-pass filter 33 having a suitable phase characteristic, wherein the signal is eliminated of its high-frequency components (odd-number-order hermonics) mentioned above, and then supplied to a frequency characteristic compensator 34.

The frequency characteristic compensator 34 suppresses (attenuates) the carrier deviation frequency band of the frequency-modulated luminance signal. In the above numerical example, the carrier deviation frequency band of the frequency-modulated luminance signal is 3.8 MHz to 5.4 MHz, and therefore, the above suppression will take place having its center at approximately 4.8 MHz.

Figure 3:
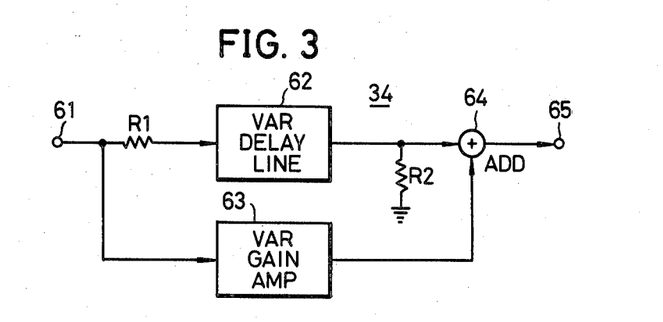
FIG. 3 is a systematic circuit diagram of an embodiment of a frequency characteristic compensation circuit within the systematic block diagram of FIG. 1.

An embodiment of the above frequency characteristic compensator 34 will be described in conjunction with FIG. 3 and 4. In FIG. 3, a variable delay line 62 is terminated at both the sending and receiving terminals, and the delay time $\tau$ is determined by $1/2fc$, where fc is selected to be the carrier wave deviation frequency band of the frequency-modulated luminance signal. Using the above numerical example, for example, this carrier wave deviation frequency band is 3.8 MHz to 5.4 MHz, and thus the center of the carrier wave deviation frequency band of the frequency-modulated luminance signal in the video signal part is approximately 4.8 MHz, and the above delay time $\tau$ is determined so that the dip part of FIG. 5 becomes approximately 4.8 MHz.

The frequency-modulated luminance signal from the low-pass filter 33 which is applied to an input terminal 61, is rectified by a sending terminal rectifying resistor R1 and supplied to a variable delay line 62. This signal supplied to the variable delay line 62 is added with a delay time $\tau$ therein, undergoes matching by a receiving terminal matching resistor R2, and then supplied to an adder 64. On the other hand, the above reproduced frequency-modulated luminance signal from the input terminal 61 is supplied to the adder 64 after being amplified by a variable gain amplifier 63. The signal thus supplied to the adder 61 is added with the delay signal from the variable delay line 62 in the same phase. Hence, the added output signal from the adder 64 is supplied to an amplitude limiter 35 of FIG. 1 through an output terminal 65.

Figure 4:
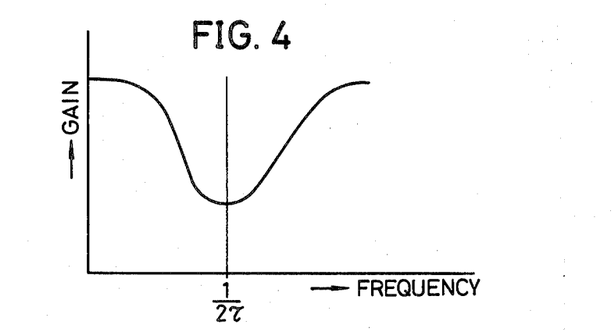
FIG. 4 is a graph showing the characteristic between the frequency versus gain, for describing the operation of the circuit of FIG. 3.

Accordingly, the frequency versus gain characteristic of the frequency characteristic compensator having a circuit construction shown in FIG. 3 becomes of the form shown in FIG. 4, a characteristic in which the predetermined frequency $1/(2\tau)$ ($=fc$) and its neighboring frequencies are relatively suppressed as compared to the other frequencies. Therefore, the position of the suppressing frequency can be varied by varying the delay time $\tau$ of the variable delay line 62, and moreover, the depth (suppression quantity) of the dip in the characteristic of FIG. 4 can be varied by varying the gain of the variable gain amplifier 63. Furthermore, this circuit is characterized in that the phase characteristic substantially does not change even when the suppression quantity is varied, because the variable delay line 62 is used.

Hence, the frequency-modulated luminance signal obtained, having its carrier wave shifting frequency band suppressed and both sides of the band relatively emphasized by the frequency characteristic compensator 34 of the circuit construction shown in FIG. 3, is, supplied to the amplitude limiter 35 wherein the amplitude fluctuation component introduced by the above compensation of the frequency characteristic is eliminated, and then supplied to a high-pass filter 36.

Figure 2F:
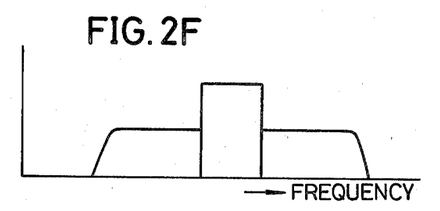

The high-pass filter 36 is provided in order to eliminate the unwanted low-frequency components, and also to obtain a frequency characteristic and frequency spectrum of the frequency-modulated luminance signal which are similar to those obtained upon normal recording of a signal onto a magnetic tape, and selected to have characteristics identical to those of the high-pass filter 15 in the recording system. Accordingly, the output frequency-modulated luminance signal of the high-pass filter 36 has a frequency spectrum approximately equal to that of the frequency-modulated luminance signal obtained from the above high-pass filter 15, as shown in FIG. 2F, and supplied to a mixer 37.

On the other hand, the low-band frequency converted carrier chrominance signal having a frequency spectrum shown in FIG. 2C, which is separated from the reproduced signal by the low-pass filter 29, is supplied to an automatic chrominance level adjusting circuit 30 wherein the level of the color burst signal is automatically adjusted to be constant. Then, the signal thus obtained from the automatic chrominance level adjusting circuit 30 is supplied to a burst extension circuit 38.

By repetitively performing the dubbing, the energy of the color burst signal component, becomes inconsiderably smaller than the reproduced low-band frequency converted carrier chrominance signal part excluding the color burst signal part, through the magnetic recording and reproducing process. Therefore, the burst extension circuit 38 uses a pulse generated during periods corresponding to the existing period of the color burst signal, and derives as output a low-band frequency converted carrier chrominance signal having extended only its color burst signal level, hence eliminating the above inconveniences.

Figure 5:
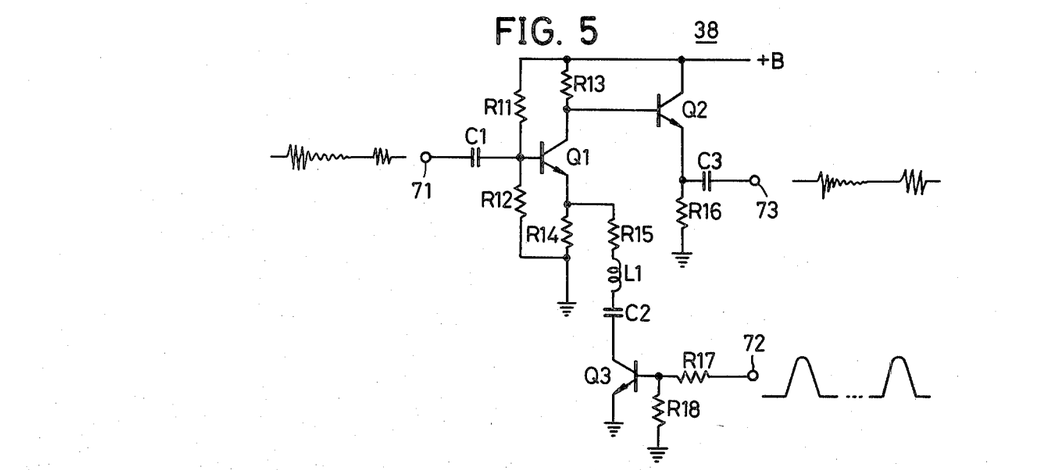
FIG. 5 is a definite circuit diagram showing an embodiment of a burst signal extension circuit within the systematic block diagram of FIG. 1.

FIG. 5 shows a definite circuit of an embodiment of the above burst extension circuit 38. A reproduced low-band frequency converted carrier chrominance signal input terminal 71 is applied to the base of an NPN-transistor Q1 through a capacitor C1. The NPN-transistor Q1 has base biasing resistors R11 and R12 connected at its base, a collector load resistor R13 connected at its collector, and its emitter is grounded through a resistor R14. Furthermore, the collector of the NPN-transistor Q1 is connected to the base of an NPN-transistor Q2, and on the other hand, the emitter of the transistor Q1 is connected to an NPN-transistor Q3 which has its emitter grounded, through a series resonance circuit comprising a resistor R15, a coil L1, and a capacitor C2. The base of the transistor Q3 is connected to a control pulse input terminal 72 through voltage dividing resistors R17 and R18. Moreover, the emitter of the transistor Q2 is grounded through a resistor R16, and also connected to an output terminal 73 through a capacitor C3.

The reproduced low-band frequency converted carrier chrominance signal from the automatic chrominance level adjusting circuit 30, which is applied to the input terminal 71 of the burst extension circuit 38 of the above circuit construction, is supplied to the base of the transistor Q1 wherein the signal is amplified, and applied to the base of the transistor Q2 from the collector of the transistor Q1.

On the other hand, a control pulse substantially equal in phase as that of the color burst signal, and also in the existing period of the color burst signal of the above reproduced low-band frequency converted carrier chrominance signal from the input terminal 71, is applied to the base of the transistor Q3 through the input terminal 72. Accordingly, the transistor Q3 is turned ON only during the period in which the transistor Q3 is applied with the color burst signal, and turned OFF during any other periods. Therefore, the gain of the transistor Q1 is (R13)/(R14) during the input period of the reproduced low-band frequency converted carrier chrominance signal other than the color burst signal parts when the transistor Q3 is OFF. However, during the input period of the color burst signal when the transistor Q3 is ON, the gain of the transistor Q1 becomes a large gain, namely, a ratio between the resistance of the resistor R13 and the parallel impedance of the resistor R14 and resistor R15, coil L1, capacitor C2, and the saturated region resistance (ON resistance) of the transistor Q3. Hence, the reproduced low-band frequency converted carrier chrominance signal is obtained from the output terminal 73 after it is amplified by the transistor Q1 and undergoes impedance-conversion by the transistor Q2. Of the above signal obtained, only the color burst signal level is extended by a gain larger than those of the other signals. This extension rate of the color burst signal is determined by taking into consideration, the rate at which the color burst signal level becomes low upon one dubbing of the signal, namely, selected at about 1 dB at the highest.

The reproduced low-band frequency converted carrier chrominance signal through the burst extension circuit 38 which performs the above described operation, is supplied to the mixer 37, wherein the signal is multiplexed with the frequency-modulated luminance signal from the high-pass filter 36. Here, the mixing ratio between the low-band frequency converted carrier chrominance signal and the frequency-modulated luminance signal at the mixer 37 is, approximately 1/9 to 1/7.

The multiplexed signal obtained from the mixer 37 has a frequency spectrum quite similar to the frequency spectrum shown in FIG. 2B. The output signal of the mixer 37 is supplied to an input terminal 54 of the recording apparatus 100, through a cable 55 connected to an output terminal 53 of the reproducing apparatus 101. The multiplexed signal thus obtained, is recorded onto an unrecorded magnetic tape 23 by the magnetic head 22, by being successively passed through the changeover switch 20 connected to the contact b and the recording amplifier 21.

According to the present embodiment of a color video signal dubbing system, the degradation in the frequency characteristic, pulse characteristic, and linearity is quite small, and the beat disturbance is greatly reduced, resulting in a fine dubbing of the color video signal. Moreover, by employing a block diagram shown by the dotted lines of FIG. 1, generation of a reversal effect is prevented, since the frequency spectrum of the reproduced frequency-modulated luminance signal is restored to a frequency spectrum substantially identical to that of the recording system. Furthermore, compensation can be made on the falling energy level of the color burst signal due to the dubbing.

In the present embodiment of the invention, it is of course possible to monitor the color video signals presently being dubbed, by supplying the reproduced color video signal which is obtained from an output terminal 47 through a circuit system identical to the reproducing system of the known magnetic recording and/or reproducing apparatus, to a television receiver. That is, the frequency-modulated luminance signal obtained from the drop-out compensator 28 is supplied to a frequency demodulator 40 through the amplitude limiter 39. The luminance signal thus frequency demodulated by the frequency demodulator 40 is supplied to a mixer 45 through a low-pass filter 41 wherein unwanted high-frequency components are eliminated therefrom.

On the other hand, the low-band frequency converted carrier chrominance signal having constant color burst signal level, which is obtained from the automatic chrominance level adjusting circuit 30, is supplied to a frequency converter 43 through a low-pass filter 42. The frequency converter 43, together with a band-pass filter 44, a burst signal gating circit 48, a phase comparator 49, a voltage-controlled oscillator 51, a frequency converter 52, and an oscillator 50, forms an automatic phase control (APC) loop. By this APC loop, the above reproduced low-band frequency converted carrier chrominance signal is corrected to eliminate its time-axis fluctuation introduced upon recording and reproduction by the frequency converter 43, namely, by obtaining a difference signal between the above low-band frequency converted carrier chrominance signal and the signal from the frequency converter 52 having a time-axis fluctuation identical to that of the low-band frequency converted carrier chrominance signal. Moreover, this low-band frequency converted carrier chrominance signal is converted back into its original band (chrominance subcarrier wave frequency of 3.58 MHz). A reproduced carrier chrominance signal thus obtained is supplied to the mixer 45. Accordingly, a reproduced color video signal is obtained from the mixer 45 by multiplexing the reproduced luminance signal and the reproduced carrier chrominance signal, and supplied as output from the output terminal 47 through an output amplifier 46.

Next, another embodiment of the frequency characteristic compensator 34 will be described in conjunction with FIG. 6. A terminal 81 is connected to the base of an NPN-transistor Q11 which is base-biased by resistors R21 and R22. The emitter of this transistor Q11 is grounded through a resistor R23, and also connected to the emitter of an NPN-transistor Q12 through a series connection of a resistor R24 and a parallel resonance circuit comprising a resistor R25, a coil L11, and a capacitor C12. Furthermore, the connection point between the above resistor R24 and the parallel resonance circuit is connected to the base of the transistor Q12 through the series connected capacitor C13 and variable resistor R26.

The collector of the transistor Q12 is connected to a collector load resistor R27 on one hand, and connected to the base of an NPN-transistor Q13 on the other. Moreover, the emitter of this transistor Q13 is connected to an output terminal 82, and also grounded through series connected resistors R30 and R31. The connection point between these resistors R30 and R31 is connected to the base of the transistor Q12 through a feedback resistor R29. An emitter resistor R28 is provided between the emitter of the transistor Q12 and the ground.

In the frequency characteristic compensator 34 of the above described circuit construction, the frequency-modulated luminance signal, from the low-pass filter 33 which is applied to the input terminal 81, is supplied to the base of the transistor Q11 through a capacitor C11. This signal thus supplied to the base of the transistor Q11 undergoes impedance-conversion therein, and, from its emitter, supplied to the emitter of the transistor Q12 through the resistor R24 and the parallel resonance circuit comprising the resistor R25, coil L11, and capacitor C12. On the other hand, the output signal of the emitter of the transistor Q11, obtained through the resistor R24, is also supplied to the base of the transistor Q12 through the series connected capacitor C13 and variable resistor R26.

Accordingly, the input signal at the base of the transistor Q12 which has undergone phase-inversion and amplification therein, as well as the input at the emitter of the transistor Q12 which has undergone amplification in the same phase, are obtained from its collector. These signals thus obtained, are added and supplied to the base of the transistor Q13. Therefore, the added output signal from the collector of the transistor Q12 undergoes impedance-conversion, and thus supplied to the output terminal 82 through the emitter of the transistor Q13.

Hereupon, the anti-resonance frequency of the above parallel resonance circuit is selected to a frequency in the carrier wave deviation frequency band of the reproduced frequency-modulated luminance signal. Accordingly, when the carrier wave deviation frequency band of the reproduced frequency-modulated luminance signal is, for example, 3.8 MHz to 5.4 MHz, the center frequency of the deviation frequency band of the reproduced frequency-modulated luminance signal in the video signal is approximately 4.8 MHz, and thus, this frequency of 4.8 MHz is selected at the anti-resonance frequency of the above parallel resonance circuit.

Figure 6:
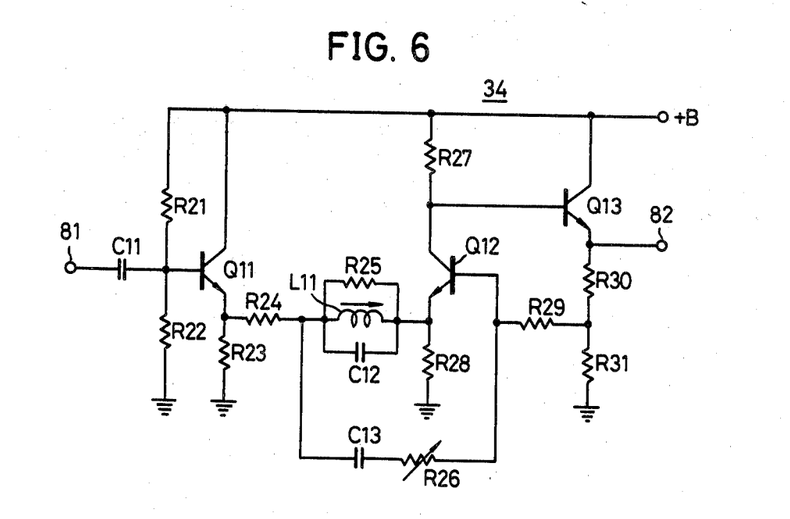
FIG. 6 is a definite circuit diagram showing another embodiment of a frequency characteristic compensation circuit.
Figure 7:
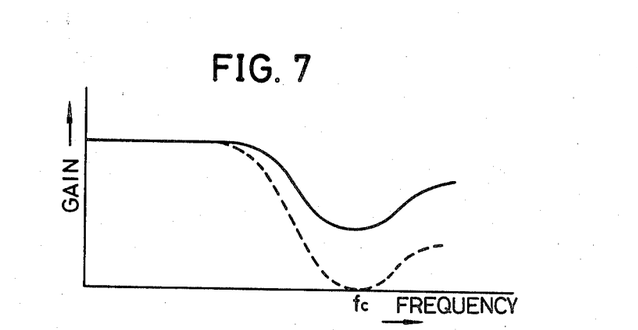
FIG. 7 is a graph showing the characteristic between the frequency versus gain of the circuit of FIG. 6.

The frequency versus gain characteristic of the frequency characteristic compensator 34 of the circuit construction shown in FIG. 6, is shown in FIG. 7. FIG. 7 shows a characteristic in which, the anti-resonance frequency of the above parallel resonance circuit, or, in this case, the approximate center frequency fc in the deviation frequency band of the reproduced frequency-modulated luminance signal, and its neighboring frequencies are relatively suppressed in relation to the other frequencies. The suppressed frequency position can be varied without varying the quality factor Q (Q-value) of the parallel resonance circuit, by varying the inductance of the coil L11 within the parallel resonance circuit. In addition, the depth (suppressed quantity) of the dip in the characteristic can be varied, by varying the resistance of the variable resistor R26. This frequency characteristic compensator 34 of the above described construction is characterized in that, its phase characteristic is superior because the suppression quantity in the frequency versus gain characteristic can be made large, even when the resistances of the resistors R24 and R25 are low and the Q-value of the above parallel resonance circuit is low. Furthermore, this compensator of the present embodiment is advantageous from the point of view of cost as compared to the compensator of the construction in which a variable delay line is used and the input and output signals of this variable delay line is added.

Further, this invention is not limited to these embodiments but various variations and modifications may be made without departing from the scope of the invention.

What is claimed is:

1. A color video dubbing system comprising:

reproducing means for reproducing a signal recorded onto one magnetic medium, said recorded signal being a multiplexed signal of a frequency-modulated luminance signal obtained as the result of a luminance signal separated from the color video signal frequency modulated carrier wave to occupy a predetermined frequency band and a frequency-converted carrier chrominance signal obtained by frequency-converting a carrier chrominance signal having a color burst signal which is separated from said color video signal, said frequency-conversion being to a band lower than that of said predetermined frequency band;

separation means for separating the signal reproduced by said reproducing means into said frequency-modulated luminance signal and said frequency-converted carrier chrominance signal;

level adjusting means for adjusting the level of said frequency-converted carrier chrominance signal separated by said separation means so that said color burst signal is held to a constant level;

first frequency characteristic compensation means for compensating for the degradation in the frequency characteristic of said frequency-modulated luminance signal, introduced upon a recording and reproducing processes of said frequency-modulated luminance signal separated by said separation means;

first amplitude limiting means for limiting the amplitude of the output frequency-modulated luminance signal of said first frequency characteristic compensation means and averaging its upper and lower side bands;

second frequency characteristic compensation means for performing a frequency characteristic compensation in which the carrier wave components of the output frequency-modulated luminance signal of said first amplitude limiting means is relatively lowered with respect to the side bands of said output frequency-modulated luminance signal;

second amplitude limiting means for eliminating the amplitude fluctuation components of the output frequency-modulated luminance signal of said second frequency characteristic compensation means;

mixing means for mixing the output frequency-modulated luminance signal of said second amplitude limiting means with the output frequency-converted carrier chrominance signal of said level adjusting means;

recording means for recording the output signal of said mixing means onto another magnetic medium; and high-pass filter means for eliminating the unwanted low-frequency components of the output frequency-modulated luminance signal of said second amplitude limiting means and for making its frequency characteristic and frequency spectrum the same as those of the frequency-modulated luminance signal upon recording of the signal onto said one magnetic medium, said high-pass filter means supplying its output frequency-modulated luminance signal to said mixing means.

2. A color video signal dubbing system comprising:

reproducing means for reproducing a signal recorded onto one magnetic medium, said recorded signal being a multiplexed signal of a frequency-modulated luminance signal obtained as the result of a luminance signal separated from the color video signal frequency moulated carrier wave to occupy a predetermined frequency band and a frequency-converted carrier chrominance signal obtained by frequency-converting a carrier chrominance signal having a color burst signal which is separated from said color video signal, said frequency-conversion being to a band lower than that of said predetermined frequency band;

separation means for separating the signal reproduced by said reproducing means into said frequency-modulated luminance signal and said frequency-converted carrier chrominance signal;

level adjusting means for adjusting the level of said frequency-converted carrier chrominance signal separated by said separation means so that said color burst signal is held to a constant level;

first frequency characteristic compensation means for compensating for the degradation in the frequency characteristic of said frequency-modulated luminance signal, introduced upon a recording and reproducing processes of said frequency-modulated luminance signal separated by said separation means;

first amplitude limiting means for limiting the amplitude of the output frequency-modulated luminance signal of said first frequency characteristic compensation means and averaging its upper and lower side bands;

second frequency characteristic compensation means for performing a frequency characteristic compensation in which the carrier wave components of the output frequency-modulated luminance signal of said first amplitude limiting means is relatively lowered with respect to the side bands of said output frequency-modulated luminance signal;

second amplitude limiting means for eliminating the amplitude fluctuation components of the output frequency-modulated luminance signal of said second frequency characteristic compensation means;

mixing means for mixing the output frequency-modulated luminance signal of said second amplitude limiting means with the output frequency-converted carrier chrominance signal of said level adjusting means;

recording means for recording the output signal of said mixing means onto another magnetic medium; and color burst extension means for relatively extending only the color burst signal level of the output frequency-converted carrier chrominance signal of said level adjusting means, said color burst extension means supplying its output signal to said mixing means.

3. A color video signal dubbing system comprising:

reproducing means for reproducing a signal recorded onto one magnetic medium, said recorded signal being a multiplexed signal of a frequency-modulated luminance signal obtained as the result of a luminance signal separated from the color video signal frequency modulated carrier wave to occupy a predetermined frequency band and a frequency-converted carrier chrominance signal obtained by frequency-converting a carrier chrominance signal having a color burst signal which is separated from said color video signal, said frequency-conversion being to a band lower than that of said predetermined frequency band;

separation means for separating the signal reproduced by said reproducing means into said frequency-modulated luminance signal and said frequency-converted carrier chrominance signal;

level adjusting means for adjusting the level of said frequency-converted carrier chrominance signal separated by said separation means so that said color burst signal is held to a constant level;

first frequency characteristic compensation means for compensating for the degradation in the frequency characteristic of said frequency-modulated luminance signal, introduced upon a recording and reproducing processes of said frequency-modulated luminance signal separated by said separation means;

first amplitude limiting means for limiting the amplitude of the output frequency-modulated luminance signal of said first frequency characteristic compensation means and averaging its upper and lower side bands;

second frequency characteristic compensation means for performing a frequency characteristic compensation in which the carrier wave components of the output frequency-modulated luminance signal of said first amplitude limiting means is relatively lowered with respect to the side bands of said output frequency-modulated luminance signal;

second amplitude limiting means for eliminating the amplitude fluctuation components of the output frequency-modulated luminance signal of said second frequency characteristic compensation means;

mixing means for mixing the output frequency-modulated luminance signal of said second amplitude limiting means with the output frequency-converted carrier chrominance signal of said level adjusting means;

recording means for recording the output signal of said mixing means onto another magnetic medium; and high-pass filter means for eliminating the unwanted low-frequency components of the output frequency-modulated luminance signal of said second amplitude limiting means and for making its frequency characteristic and frequency spectrum the same as those of the frequency-modulated luminance signal upon a recording of the signal onto said one magnetic medium, and color burst extension means for relatively extending only the color burst signal level of the output frequency-converted carrier chrominance signal of said level adjusting means, said high-pass filter means supplying its output frequency-modulated luminance signal to said mixing means, and said color burst extension means supplying its output signal to said mixing means.

4. A color video signal dubbing system comprising:

reproducing means for reproducing a signal recorded onto one magnetic medium, said recorded signal being a multiplexed signal of a frequency-modulated luminance signal obtained as the result of a luminance signal separated from the color video signal frequency modulated carrier wave to occupy a predetermined frequency band and a frequency-converted carrier chrominance signal obtained by frequency-converting a carrier chrominance signal having a color burst signal which is separated from said color video signal, said frequency-conversion being to a band lower than that of said predetermined frequency band;

separation means for separating the signal reproduced by said reproducing means into said frequency-modulated luminance signal and said frequency-converted carrier chrominance signal;

level adjusting means for adjusting the level of said frequency-converted carrier chrominance signal separated by said separation means so that said color burst signal is held to a constant level;

first frequency characteristic compensation means for compensating for the degradation in the frequency characteristic of said frequency-modulated luminance signal, introduced upon a recording and reproducing processes of said frequency-modulated luminance signal separated by said separation means;

first amplitude limiting means for limiting the amplitude of the output frequency-modulated luminance signal of said first frequency characteristic compensation means and averaging its upper and lower side bands;

second frequency characteristic compensation means for performing a frequency characteristic compensation in which the carrier wave components of the output frequency-modulated luminance signal of said first amplitude limiting means is relatively lowered with respect to the side bands of said output frequency-modulated luminance signal, said second frequency characteristic compensation means comprising a delay line which delays the output signal of said first amplitude limiting means supplied therein by a predetermined delay time, an amplifier which amplifies the output signal of said first amplitude limiting means supplied therein, an adder for adding the output signal of said delay line and the output signal of said amplifier in the same phase with each other;

second amplitude limiting means for eliminating the amplitude fluctuation components of the output frequency-modulated luminance signal of said second frequency-characteristic compensation means, said adder supplying its output signal to said second amplitude limiting means;

mixing means for mixing the output frequency-modulated luminance signal of said second amplitude limiting means with the output frequency-converted carrier chrominance signal of said level adjusting means; and recording means for recording the output signal of said mixing means onto another magnetic medium.

5. A system as claimed in claim 4 in which said delay line is a variable delay line which is capable of varying its delay time, and said amplifier is a variable gain amplifier which is capable of varying its gain.

6. A color video signal dubbing system comprising:
reproducing means for reproducing a signal recorded onto one magnetic medium, said recorded signal being a multiplexed signal of a frequency-modulated luminance signal obtained as the result of a luminance signal separated from the color video signal frequency modulated carrier wave to occupy a predetermined frequency band and a frequency-converted carrier chrominance signal obtained by frequency-converting a carrier chrominance signal having a color burst signal which is separated from said color video signal, said frequency-conversion being to a band lower than that of said predetermined frequency band;
separation means for separating the signal reproduced by said reproducing means into said frequency-modulated luminance signal and said frequency-converted carrier chrominance signal;
level adjusting means for adjusting the level of said frequency-converted carrier chrominance signal separated by said separation means so that said color burst signal is held to a constant level;
first frequency characteristic compensation means for compensating for the degradation in the frequency characteristic of said frequency-modulated luminance signal, introduced upon a recording and reproducing processes of said frequency-modulated luminance signal separated by said separation means;
first amplitude limiting means for limiting the amplitude of the output frequency-modulated luminance signal of said first frequency characteristic compensation means and averaging its upper and lower side bands;
second frequency characteristic compensation means for performing a frequency characteristic compensation in which the carrier wave components of the output frequency-modulated luminance signal of said first amplitude limiting means is relatively lowered with respect to the side bands of said output frequency-modulated luminance signal, said second frequency characteristic compensation means comprising a resonance circuit which is supplied with the output signal of said first amplitude limiting means and which has a resonance frequency equal to substantially the center frequency of the carrier wave component of said frequency-modulated luminance signal, a circuit means for deriving a difference signal between the input and output signals of said resonance circuit and for supplying the difference signal to said second amplitude limiting means;
second amplitude limiting means for eliminating the amplitude fluctuation components of the output frequency-modulated luminance signal of said second frequency characteristic compensation means;
mixing means for mixing the output frequency-modulated luminance signal of said second amplitude limiting means with the output frequency-converted carrier chrominance signal of said level adjusting means; and
recording means for recording the output signal of said mixing means onto another magnetic medium.

7. A color video signal dubbing system comprising:
reproducing means for reproducing a color video signal recorded on a magnetic medium, said recorded color video signal being a combination of a frequency-modulated luminance signal occupying a predetermined frequency band and a carrier chrominance signal including a color burst signal occupying a frequency band which is lower than said predetermined frequency band;
separation means for separating the color video signal reproduced by said reproducing means into said frequency-modulated luminance signal and said carrier chrominance signal;
level adjusting means for adjusting the level of said carrier chrominance signal separated by said separation means so that said color burst signal is held to a constant level;
frequency characteristic compensation means coupled to said separation means, for compensating for a degradation in the frequency characteristic of the separated frequency-modulated luminance signal by boosting high-frequency components thereof, said degradation being introduced in a process of reproducing said frequency-modulated luminance signal from the magnetic medium;
amplitude limiting means coupled to said frequency characteristic compensation means, for limiting the amplitude of the output frequency-modulated luminance signal of said frequency characteristic compensation means so that lower and higher sideband components of said frequency-modulated luminance signal are balanced;
mixing means for mixing the output frequency-modulated luminance signal of said frequency characteristic compensation means with the output chrominance signal of said level adjusting means; and
output means for delivering the output signal of said mixing means, said output signal being substantially equal to said color video signal reproduced from said magnetic medium by said reproducing means.

8. A color video signal dubbing system comprising:
reproducing means for reproducing a color video signal recorded on a magnetic medium, said recorded color video signal being a combination of a frequency-modulated luminance signal occupying a predetermined frequency band and a carrier chrominance signal including a color burst signal occupying a frequency band which is lower than said predetermined frequency band;
separation means for separating the color video signal reproduced by said reproducing means into said frequency-modulated luminance signal and said carrier chrominance signal;
level adjusting means for adjusting the level of said carrier chrominance signal separated by said separation means so that said color burst signal is held to a constant level;
first frequency characteristic compensation means coupled to said separation means, for compensating for a degradation in the frequency characteristic of the separated frequency-modulated luminance signal by boosting high-frequency components thereof, said degradation being introduced in a process of reproducing said frequency-modulated luminance signal from the magnetic medium;
first amplitude limiting means coupled to said first frequency characteristic compensation means, for limiting the amplitude of the output frequency-modulated luminance signal of said first frequency characteristic compensation means so that lower and higher sideband components of said frequency-modulated luminance signal are balanced;

second frequency characteristic compensation means for carrying out a frequency characteristic compensation so that carrier wave components of the output frequency-modulated luminance signal of said first amplitude limiting means is relatively lowered with respect to the sidebands of said output frequency-modulated luminance signal;

second amplitude limiting means coupled to said second frequency characteristic compensation means, for eliminating amplitude fluctuation components of the output frequency-modulated luminance signal of said second frequency characteristic compensation means;

mixing means for mixing the output frequency-modulated luminance signal of sid second amplitude limiting means with the output chrominance signal of said level adjusting means; and output means for delivering the output signal of said mixing means, said output signal being substantially equal to said color video signal reproduced from said magnetic medium by said reproducing means.

9. A color video signal dubbing system as claimed in claim 8 which further comprises high-pass filter means coupled to said second amplitude limiting means, for eliminating unwanted low-frequency components of the output frequency-modulated luminance signal of said second amplitude limiting means and for making its frequency characteristic and frequency spectrum substantially equal to those of the frequency-modulated luminance signal upon a recording of the signal onto said magnetic medium, said high-pass filter means supplying its output frequency-modulated luminance signal to said mixing means.

10. A color video signal dubbing system as claimed in claim 8 which further comprises color burst extension means coupled to said level adjusting means, for relatively extending only the color burst signal level of the output chrominance signal of said level adjusting means, said color burst extension means supplying its output signal to said mixing means.

11. A color video signal dubbing system as claimed in claim 8 which further comprises high-pass filter means coupled to said second amplitude limiting means, for eliminating unwanted low-frequency components of the output frequency-modulated luminance signal of said second amplitude limiting means and for making its frequency characteristic and frequency spectrum substantially equal to those of the frequency-modulated luminance signal upon a recording of the signal onto said magnetic medium, and color burst extension means coupled to said level adjusting means, for relatively extending only the color burst signal level of the output chrominance signal of said level adjusting means, said high-pass filter means supplying its output frequency-modulated luminance signal to said mixing means, and said color burst extension means supplying its output signal to said mixing means.

12. A color video signal dubbing system as claimed in claim 8 in which said second frequency characteristic compensation means comprises a delay line for delaying the output signal of said first amplitude limiting means supplied thereto by a predetermined delay time, an amplifier for amplifying the output signal of said first amplitude limiting means supplied thereto, and an adder for adding the output signal of said delay line and the output signal of said amplifier in the same phase with each other, said adder supplying its output signal to said second amplitude limiting means.

13. A color video signal dubbing system as described in claim 8 in which said second frequency characteristic compensation means comprises a resonant circuit supplied with the output signal of said first amplitude limiting means and having a resonance frequency equal to substantially the center frequency of the carrier wave component of said frequency-modulated luminance signal, and a circuit for deriving a difference signal between the input and output signals of said resonant circuit and supplying the difference signal to said second amplitude limiting means.

14. A color video signal dubbing system comprising a recording apparatus for recording an input signal on one magnetic medium, and a reproducing apparatus for reproducing the recorded signal from said magnetic medium, said reproducing apparatus supplying a reproduced signal to said recording apparatus and said recording apparatus dubbing said reproduced signal on another magnetic medium, in which said recording apparatus comprises:

first separation means for separating an input color video signal into a luminance signal and a carrier chrominance signal;

first means for obtaining a frequency-modulated luminance signal occupying a predetermined frequency band, from the separated luminance signal;

second means for obtaining a chrominance signal including a color burst signal occupying a frequency band which is lower than said predetermined frequency band, from the separated carrier chrominance signal;

first mixing means for mixing and multiplexing the frequency-modulated luminance signal from said first means and the chrominance signal from said second means;

recording means for recording signals onto said one or said other magnetic medium; and switching means provided between said first mixing means and said recording means, for switching states between a state where the output signal of said first mixing means is supplied to said recording means and a state where the reproduced signal from said reproducing apparatus is supplied to said recording means, said reproducing apparatus comprises:

reproducing means for reproducing the signals recorded onto said one magnetic medium by said recording apparatus, second separation means for separating the signal reproduced by said reproducing means into said frequency-modulated luminance signal and said chrominance signal occupying the frequency band which is lower than said predetermined frequency band;

level adjusting means for adjusting the level of said chrominance signal separated by said second separation means so that said color burst signal is held to a constant level;

frequency characteristic compensation means for compensating for a degradation in the frequency characteristic of the separated frequency-modulated luminance signal by boosting high-frequency components thereof, said degradation being introduced in a process of reproducing said frequency-modulated luminance signal from said one magnetic medium;
amplitude limiting means for limiting the amplitude of the output frequency-modulated luminance signal of said frequency characteristic compensation means so that lower and higher sideband components of said frequency-modulated luminance signal are balanced, and
second mixing means for mixing the output frequency-modulated luminance signal of said frequency characteristic compensation means with the output chrominance signal of said level adjusting means, an output signal of said second mixing means being supplied to said recording means through said switching means of said recording apparatus.

* * * * *

UNITED STATES PATENT AND TRADEMARK OFFICE
CERTIFICATE OF CORRECTION

PATENT NO. : 4,396,953

DATED : August 2, 1983

INVENTOR(S) : Fujita, et al.

It is certified that error appears in the above-identified patent and that said Letters Patent is hereby corrected as shown below:

Column 10, line 20, change "moulated" to --modulated--.

Column 11, line 1, change "chromiance" to --chrominance--.

Column 15, line 19, change "sid" to --said--.

Signed and Sealed this

Thirteenth Day of March 1984

[SEAL]

Attest:

GERALD J. MOSSINGHOFF

Attesting Officer

Commissioner of Patents and Trademarks